US009992792B2

(12) United States Patent
Wu et al.

(10) Patent No.: US 9,992,792 B2
(45) Date of Patent: **\*Jun. 5, 2018**

(54) METHODS AND SYSTEMS FOR SCHEDULING A VIRTUAL MIMO COMMUNICATION ENVIRONMENT

(71) Applicant: BlackBerry Limited, Waterloo (CA)

(72) Inventors: Jianming Wu, Kanata (CA); Ming Jia, Ottawa (CA); Wen Tong, Ottawa (CA); Peiying Zhu, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/219,989

(22) Filed: Jul. 26, 2016

(65) Prior Publication Data

US 2016/0338090 A1    Nov. 17, 2016

Related U.S. Application Data

(63) Continuation of application No. 14/594,519, filed on Jan. 12, 2015, which is a continuation of application
(Continued)

(51) Int. Cl.
*H04B 7/02* (2018.01)
*H04W 72/12* (2009.01)
(Continued)

(52) U.S. Cl.
CPC ...... *H04W 72/1268* (2013.01); *H04B 7/0452* (2013.01); *H04B 7/0613* (2013.01); *H04J 11/003* (2013.01); *H04L 5/001* (2013.01); *H04L 5/0023* (2013.01); *H04L 5/0037* (2013.01); *H04L 5/0051* (2013.01); *H04L 5/0075* (2013.01); *H04L 25/0222* (2013.01);
(Continued)

(58) Field of Classification Search
CPC ... H04W 72/121; H04W 72/08; H04W 74/04; H04B 7/0452; H04B 1/707
See application file for complete search history.

(56) References Cited

U.S. PATENT DOCUMENTS 6,760,882 B1    7/2004   Gesbert et al.
6,850,741 B2    2/2005   Lei et al.
(Continued)

FOREIGN PATENT DOCUMENTS

WO    03041300 A1    5/2003

OTHER PUBLICATIONS

Office Action dated Nov. 7, 2008; U.S. Appl. No. 11/336,371, filed Jan. 20, 2006; 10 pages.
(Continued)

*Primary Examiner* — Lakeram Jangbahadur
(74) *Attorney, Agent, or Firm* — Conley Rose, P.C.; J. Robert Brown, Jr.

(57) ABSTRACT

A system and method for scheduling cooperative uplink transmissions in a virtual multiple input multiple output (MIMO) wireless communication environment are provided. More specifically, both random and channel aware orthogonal scheduling techniques for identifying a sub-set of N mobile terminals to provide cooperative uplink transmissions for each transmit time interval are provided.

18 Claims, 14 Drawing Sheets

Related U.S. Application Data

No. 13/620,747, filed on Sep. 15, 2012, now Pat. No. 8,953,481, which is a continuation of application No. 13/103,516, filed on May 9, 2011, now Pat. No. 8,867,330, which is a continuation of application No. 11/336,371, filed on Jan. 20, 2006, now Pat. No. 7,940,640.

(51) Int. Cl.

| | | |
|---|---|---|
| H04B 7/0452 | (2017.01) | |
| H04L 5/00 | (2006.01) | |
| H04W 72/08 | (2009.01) | |
| H04J 11/00 | (2006.01) | |
| H04W 72/04 | (2009.01) | |
| H04B 7/06 | (2006.01) | |
| H04L 25/02 | (2006.01) | |
| H04W 88/08 | (2009.01) | |

(52) U.S. Cl.
CPC ....... *H04W 72/0446* (2013.01); *H04W 72/08* (2013.01); *H04W 72/082* (2013.01); *H04W 72/121* (2013.01); H04L 25/0204 (2013.01); H04W 88/08 (2013.01)

(56) References Cited

U.S. PATENT DOCUMENTS

| | | | |
|---|---|---|---|
| 7,020,110 B2 | 3/2006 | Walton et al. | |
| 7,042,858 B1* | 5/2006 | Ma | H04L 1/0618 370/208 |
| 7,061,854 B2 | 6/2006 | Tarokh et al. | |
| 7,317,680 B2 | 1/2008 | Ma et al. | |
| 7,394,860 B2 | 7/2008 | Tong et al. | |
| 7,397,864 B2 | 7/2008 | Tarokh et al. | |
| 7,428,268 B2 | 9/2008 | Shen et al. | |
| 7,773,699 B2 | 8/2010 | Jia et al. | |
| 7,940,640 B2 | 5/2011 | Wu et al. | |
| 8,140,122 B2 | 3/2012 | Park et al. | |
| 8,867,330 B2 | 10/2014 | Wu et al. | |
| 8,953,481 B2 | 2/2015 | Wu et al. | |
| 9,432,162 B2 | 8/2016 | Wu et al. | |
| 2003/0125040 A1* | 7/2003 | Walton | H04B 7/0417 455/454 |
| 2003/0128658 A1 | 7/2003 | Walton et al. | |
| 2004/0114618 A1* | 6/2004 | Tong | H04B 7/026 370/431 |
| 2004/0136349 A1* | 7/2004 | Walton | H04B 7/0417 370/338 |
| 2004/0166886 A1* | 8/2004 | Laroia | H04B 7/0491 455/522 |
| 2005/0111599 A1* | 5/2005 | Walton | H04B 1/71072 375/347 |
| 2005/0147025 A1* | 7/2005 | Auer | H04B 7/0684 370/203 |
| 2005/0243756 A1* | 11/2005 | Cleveland | H04B 7/026 370/328 |
| 2006/0034165 A1* | 2/2006 | Levy | H04W 72/042 370/208 |
| 2006/0039312 A1 | 2/2006 | Walton et al. | |
| 2006/0067417 A1 | 3/2006 | Park et al. | |
| 2006/0105761 A1 | 5/2006 | Walton et al. | |
| 2006/0159052 A1* | 7/2006 | Koga | H04B 7/0667 370/335 |
| 2006/0160495 A1* | 7/2006 | Strong | H04B 7/04 455/101 |
| 2007/0002766 A1 | 1/2007 | Park et al. | |
| 2007/0064632 A1 | 3/2007 | Zheng et al. | |
| 2007/0149236 A1 | 6/2007 | Naden et al. | |
| 2008/0019263 A1 | 1/2008 | Stolpman | |
| 2008/0075033 A1 | 3/2008 | Shattil | |
| 2009/0161606 A1 | 6/2009 | Akkarakaran et al. | |
| 2011/0055654 A1 | 3/2011 | Palanki | |
| 2011/0261776 A1 | 10/2011 | Ahn et al. | |
| 2012/0140838 A1 | 6/2012 | Kadous et al. | |
| 2013/0201862 A1 | 8/2013 | Cui et al. | |

OTHER PUBLICATIONS

Office Action dated May 15, 2009; U.S. Appl. No. 11/336,371, filed Jan. 20, 2006; 6 pages.
Office Action dated May 27, 2010; U.S. Appl. No. 11/336,371, filed Jan. 20, 2006; 6 pages.
Notice of Allowance dated Jan. 4, 2011; U.S. Appl. No. 11/336,371, filed Jan. 20, 2006; 4 pages.
Office Action dated Jan. 13, 2014; U.S. Appl. No. 13/103,516, filed May 9, 2011; 5 pages.
Office Action dated Mar. 26, 2014; U.S. Appl. No. 13/103,516, filed May 9, 2011; 10 pages.
Office Action dated Jun. 2, 2014; U.S. Appl. No. 13/103,516, filed May 9, 2011; 6 pages.
Notice of Allowance dated Jul. 18, 2014; U.S. Appl. No. 13/103,516, filed May 9, 2011; 5 pages.
Office Action dated May 23, 2014; U.S. Appl. No. 13/620,747, filed Sep. 15, 2012; 13 pages.
Final Office Action dated Aug. 29, 2014; U.S. Appl. No. 13/620,747, filed Sep. 15, 2012; 17 pages.
Notice of Allowance dated Dec. 3, 2014; U.S. Appl. No. 13/620,747, filed Sep. 15, 2012; 12 pages.
Office Action dated Jun. 4, 2015; U.S. Appl. No. 14/594,519, filed Jan. 12, 2015; 18 pages.
Final Office Action dated Oct. 2, 2015; U.S. Appl. No. 14/594,519, filed Jan. 12, 2015; 15 pages.
Office Action dated Jan. 15, 2016; U.S. Appl. No. 14/594,519, filed Jan. 12, 2015; 20 pages.
Notice of Allowance dated Jun. 2, 2016; U.S. Appl. No. 14/594,519 filed Jan. 12, 2015; 11 pages.
PCT International Search Report; Application No. PCT/IB2006/003678; Jun. 26, 2007; 2 pages.
PCT Written Opinion of the International Searching Authority; Application No. PCT/IB2006/003678; Jun. 26, 2007; 6 pages.

\* cited by examiner

METHODS AND SYSTEMS FOR SCHEDULING A VIRTUAL MIMO COMMUNICATION ENVIRONMENT

CROSS REFERENCE TO RELATED APPLICATIONS

This application is a continuation of U.S. patent application Ser. No. 14/594,519 filed Jan. 12, 2015, and since issued as U.S. Pat. No. 9,432,162, by Jianming Wu, et al., entitled "Methods and Systems for Scheduling A Virtual MIMO Communication Environment", which is a continuation of U.S. Pat. No. 8,953,481 issued on Feb. 10, 2015 Ser. No. 13/620,747, which is a continuation of U.S. Pat. No. 8,867,330 issued on Oct. 21, 2014 Ser. No. 13/103,516, which claims priority to and benefit of U.S. Pat. No. 7,940,640 issued on May 10, 2011 Ser. No. 11/336,371, all of which are incorporated by reference herein as if reproduced in their entirety.

TECHNICAL FIELD

The present disclosure relates to communications, and more particularly relates to scheduling for a virtual multiple input multiple output communication environment using mobile terminals having a single antenna.

BACKGROUND

With the ever-increasing demand for wireless transmission capacity, be it the number of users able to access a system or the speed at which data is transferred, multiple input multiple output (MIMO) architectures have evolved. MIMO architectures incorporate multiple antennas for transmission and multiple receivers for reception. In combination with various coding techniques, the spatial diversity provided by MIMO systems provides for significant increases in the number of users that can access a system at any given time, as well as the amount of data that can be transmitted over a given period of time. Unfortunately, the nature of mobile communications dictates the need for inexpensive mobile terminals, such as mobile telephones, wireless personal digital assistants (PDAs), and the like. Implementing a mobile terminal having multiple antennas significantly increases its complexity, and thus its price. To date, the price associated with providing multiple antennas and transmission paths in mobile terminals has significantly outweighed the benefit of more capacity, at least from the consumer's perspective.

Most base stations are already equipped with multiple antennas and receivers, and given the nature of such an infrastructure, the cost of providing such has prove largely significant. Thus, there exists a wireless infrastructure capable of facilitating MIMO-based communication, yet consumers are unwilling to bear the cost of completing the MIMO environment by buying property equipped mobile terminals. As such, there is a need to reap the benefit of MIMO-based communications without requiring mobile terminals to have multiple antennas.

In order to accommodate this need, virtual MIMO systems have emerged. An exemplary virtual MIMO system is disclosed in commonly owned and assigned U.S. Patent Application Publication No. 2004/0114618, entitled VIRTUAL MIMO COMMUNICATION SYSTEM, filed Dec. 16, 2002, which is hereby incorporated by reference in its entirety. In general, a virtual MIMO system is created by pairing mobile terminals. However, virtual MIMO systems require a scheduler for pairing mobile terminals. Thus, there remains a need for a scheduler for a virtual MIMO system.

SUMMARY

The present disclosure provides a system and method for scheduling cooperative uplink transmissions in a virtual multiple input multiple output (MIMO) wireless communication environment. More specifically, the present disclosure provides both random and channel aware orthogonal scheduling techniques for identifying a sub-set of N mobile terminals to provide cooperative uplink transmissions for each transmit time interval.

For random scheduling, a first mobile terminal may be selected in a round-robin fashion. Thereafter, a number of additional mobile terminals are selected randomly, thereby forming a group of mobile terminals for cooperative uplink transmission during an upcoming transmit time interval. Alternatively, mobile terminals are randomly grouped to provide potential groups of mobile terminals. One of the potential groups is selected based on proportional fairness, thereby providing a group of mobile terminals for cooperative uplink transmission during an upcoming transmit time interval.

For channel aware orthogonal scheduling, a first mobile terminal is selected in a round-robin fashion. Thereafter, a number of additional mobile terminals are selected based on orthogonality. The uplink is preferably transmitted according to either an Orthogonal Frequency Division Multiplexing (OFDM) scheme or a Single-Carrier Frequency Division Multiple Access (SC-FDMA) scheme, and the base station determines channel transfer functions for each sub-carrier frequency in each of a number of sub-channels in the uplink frequency band. The base station then determines the orthogonality of the transfer functions for the first mobile terminal and the transfer functions of the other mobile terminal. One or more mobile terminals having transfer functions that are most orthogonal with the transfer functions of the first mobile terminal are selected as the additional mobile terminals for the cooperative uplink transmission.

Alternatively, a group of mobile terminals for an uplink transmission is identified based on orthogonality and proportional fairness. More specifically, for each mobile terminal, a number of potential groups including the mobile terminal that are most orthogonal are identified. The group of mobile terminals for the uplink transmission is then selected from the potential groups for each mobile terminal based on proportional fairness.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawing figures, those skilled in the art will understand the concepts of the disclosure and will recognize applications of these concepts and applications fall within the scope of the disclosure and the accompanying claims.

Figure 1:
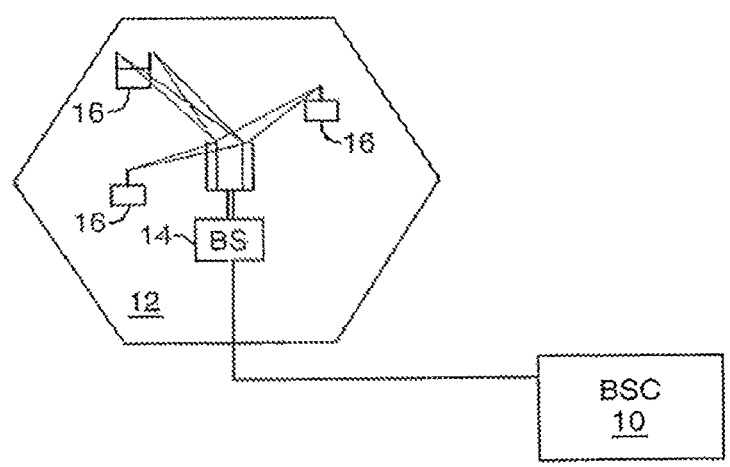
FIG. 1 is a block representation of a wireless communication environment according to one embodiment of the present disclosure.

With reference to FIG. 1, a basic wireless communication environment is illustrated. In general, a base station controller (BSC) 10 controls wireless communication within multiple cells 12, which are served by corresponding base stations (BS) 14. Each base station 14 facilitates communications with mobile terminals 16, which are within the cell 12 associated with the corresponding base station 14. For the present disclosure, the base stations 14 include multiple antennas to provide spatial diversity for communications. The mobile terminals 16 may or may not have multiple antennas, depending on the implementation of the present disclosure.

Figure 2:
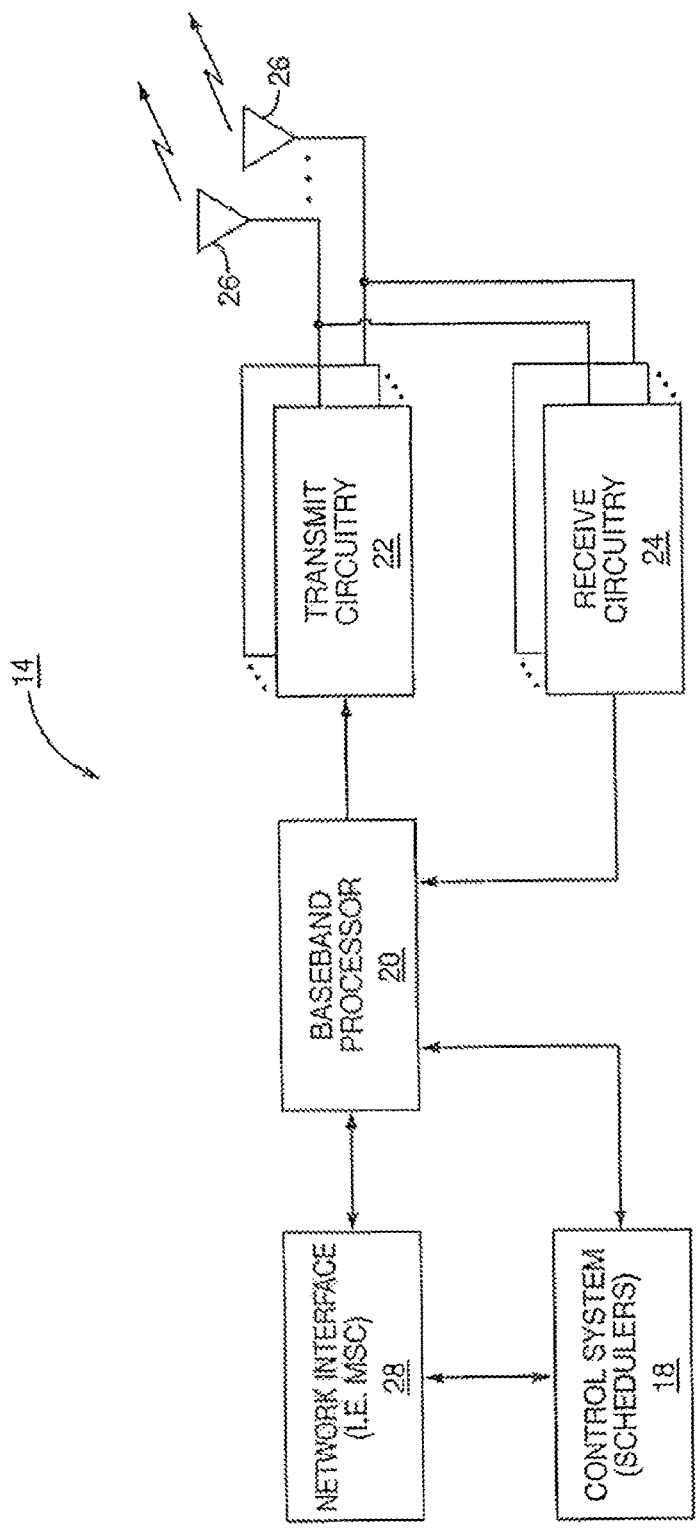
FIG. 2 is a block representation of a base station according to one embodiment of the present disclosure.

With reference to FIG. 2, a base station 14 configured according to one embodiment of the present disclosure is illustrated. The base station 14 generally includes a control system 18, a baseband processor 20, transmit circuitry 22; receive circuitry 24, multiple antennas 26, and a network interface 28. The receive circuitry 24 receives radio frequency signals through the antennas 26 bearing information from one or more remote transmitters provided by mobile terminals 16 (FIG. 1). Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 20 processes the digitized received signal to extract the information or data bits conveyed in the received signal. This processing typically comprises demodulation, decoding, and error correction operations. As such, the baseband processor 20 is generally implemented in one or more digital signal processors (DSPs). The received information is then sent across a wireless network via the network interface 28 or transmitted to another mobile terminal 16 serviced by the base station 14. The network interface 28 will typically interact with the base station controller 10 and a circuit-switched network forming a part of a wireless network, which may be coupled to the public switched telephone network (PSTN).

On the transmit side, the baseband processor 20 receives digitized data, which may represent voice, data, or control information, from the network interface 28 under the control of the control system 18, and encodes the data for transmission. The encoded data is output to the transmit circuitry 22, where it is modulated by a carrier signal having a desired transmit frequency or frequencies. A power amplifier (not shown) will amplify the modulated carrier signal to a level appropriate for transmission, and deliver the modulated carrier signal to the antennas 26 through a matching network (not shown). The multiple antennas 26 and the replicated transmit and receive circuitries 22, 24 provide spatial diversity. Modulation and processing details are described in greater detail below.

Figure 3:
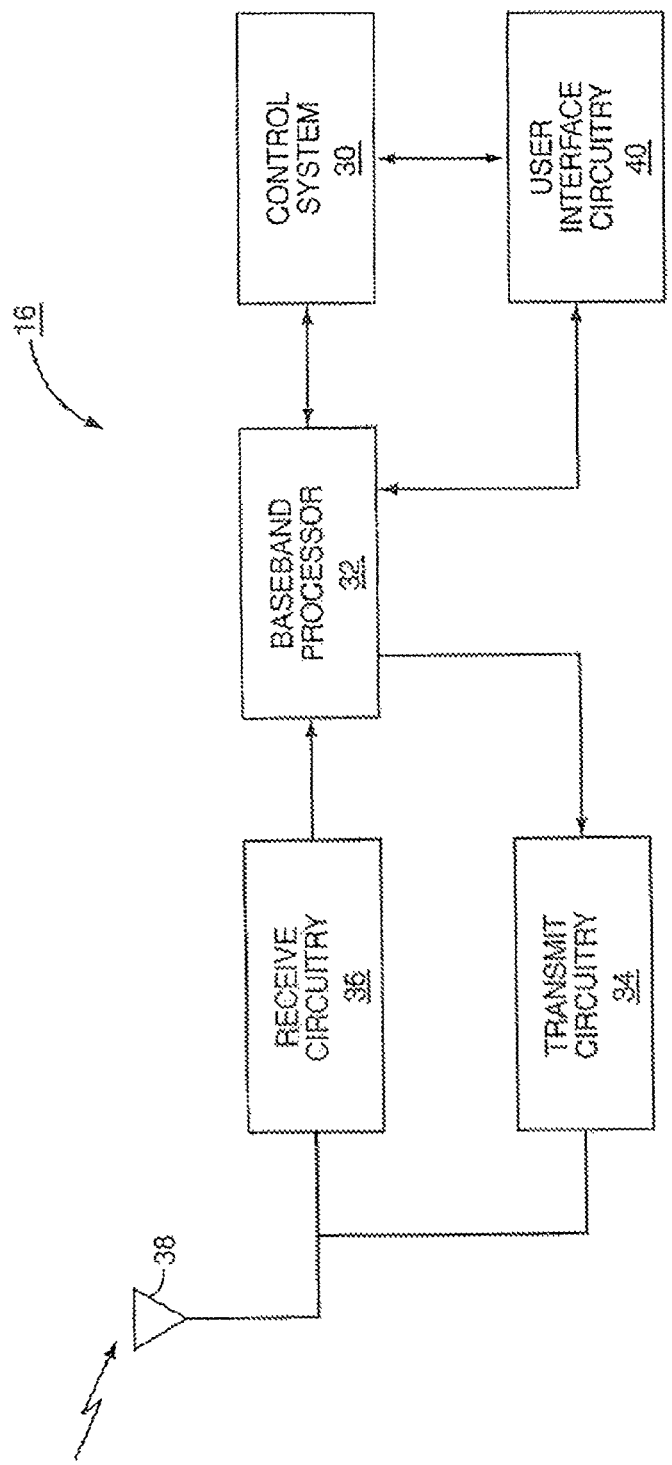
FIG. 3 is a block representation of a mobile terminal according to one embodiment of the present disclosure.

With reference to FIG. 3, a mobile terminal 16 configured according to one embodiment of the present disclosure is illustrated. Similarly to be base station 14, the mobile terminal 16 will include a control system 30, a baseband processor 32, transmit circuitry 34; receive circuitry 36, an antenna 38, and user interface circuitry 40. The receive circuitry 36 receives radio frequency signals through the antenna 38 bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 32 processes the digitized received signal to extract the information or data bits conveyed in the received signal. This processing typically comprises demodulation, decoding, and error correction operations, as will be discussed in greater detail below. The baseband processor 32 is generally implemented in one or more digital signal processors (DSPs) and application specific integrated circuits (ASICs).

For transmission, the baseband processor 32 receives digitized data, which may represent voice, data, or control information, from the control system 30, which it encodes for transmission. The encoded data is output to the transmit circuitry 34, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antenna 38 through a matching network (not shown). Modulation and processing details are described in greater detail below.

Figure 4:
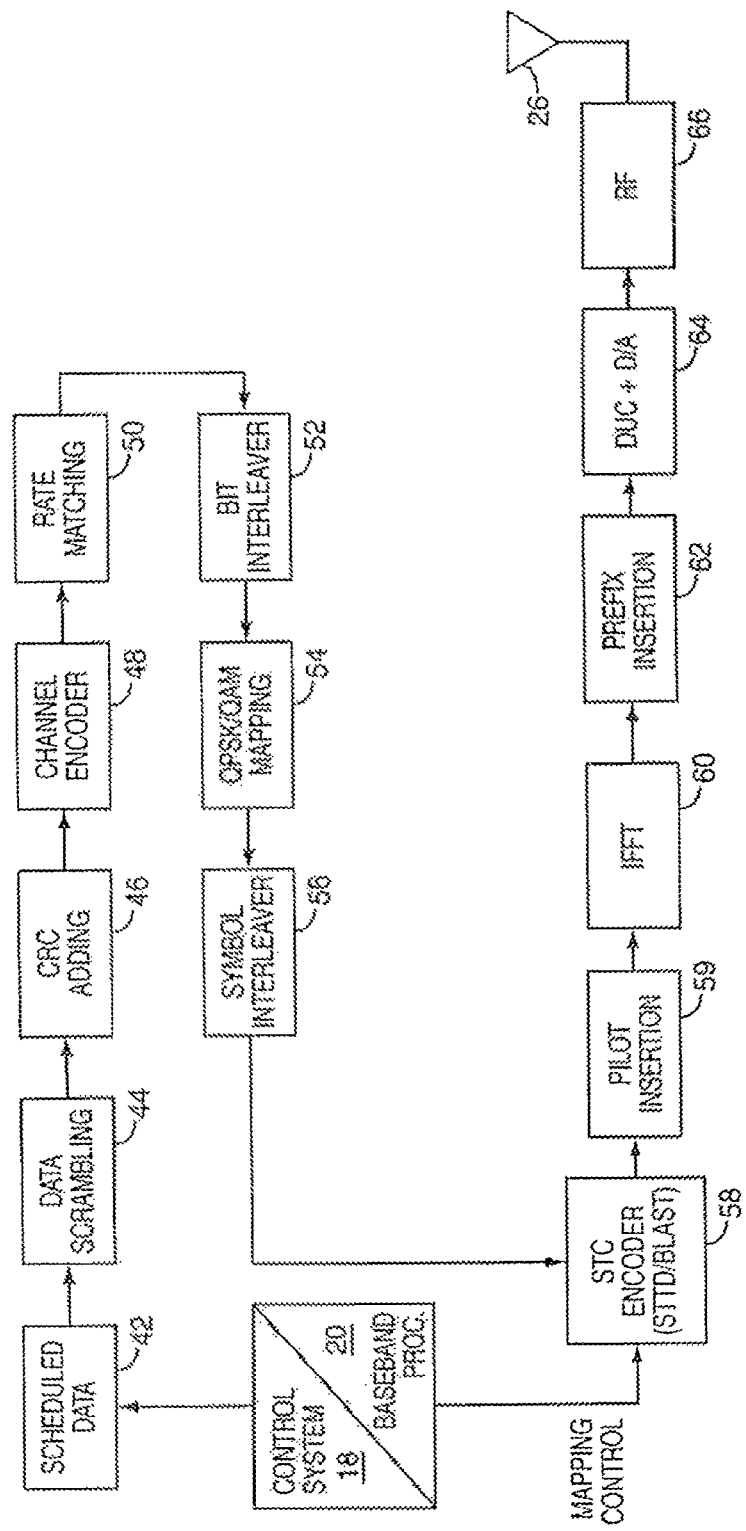
FIG. 4 is a more detailed logical representation of a mobile terminal according to one embodiment of the present disclosure.

With reference to FIG. 4, a logical transmission architecture is provided according to one embodiment of the present disclosure. The transmission architecture is described as being that of the mobile terminal 16, but those skilled in the art will recognize the applicability of the illustrated architecture for both uplink and downlink communications in a variety of wireless environments. In this exemplary embodiment, the mobile terminal 16 operates according to an OFDM modulation scheme. However, the present disclosure is equally applicable to a mobile terminal 16 transmitting according to a Single-Carrier Frequency Division Multiple Access (SC-FDMA) modulation scheme, as will be apparent to one of ordinary skill in the art upon reading this disclosure.

In OFDM modulation, the transmission band is divided into multiple sub-channels each including a number of orthogonal sub-carrier frequencies. The sub-carrier frequencies are modulated according to the digital data to be transmitted and transmitted in parallel. Because OFDM divides the transmission band into multiple sub-carrier frequencies, the bandwidth per sub-carrier decreases and the modulation time per sub-carrier increases. Since the multiple sub-carriers are transmitted in parallel, the transmission rate for the digital data, or symbols, on any given sub-carrier is lower than when a single carrier is used.

OFDM modulation requires the performance of an Inverse Fast Fourier Transform (IFFT) on the information to be transmitted. For demodulation, the performance of a Fast Fourier Transform (FFT) on the received signal is required to recover the transmitted information. In practice, the Inverse Discrete Fourier Transform (IDFT) and Discrete Fourier Transform (DFT) are implemented using digital signal processing for modulation and demodulation, respectively.

More specifically, data 42, which is a stream of bits, to be transmitted to the base station 14 is scrambled in a manner reducing the peak-to-average power ratio associated with the data using data scrambling logic 44. A cyclic redundancy check (CRC) for the scrambled data is determined and appended to the scrambled data using CRC adding logic 46. Next, channel coding is performed using channel encoder logic 48 to effectively add redundancy to the data to facilitate recovery and error correction at the mobile terminal 16. The channel encoder logic 48 uses known Turbo encoding techniques in one embodiment. The encoded data is then processed by rate matching logic 50 to compensate for the data expansion associated with encoding.

Bit interleaver logic 52 systematically reorders the bits in the encoded data to minimize the loss of consecutive data bits. The resultant data bits are systematically mapped into corresponding symbols depending on the chosen baseband modulation by mapping logic 54. Preferably, Quadrature Amplitude Modulation (QAM) or Quadrature Phase Shift Key (QPSK) modulation is used. The symbols may be systematically reordered to further bolster the immunity of the transmitted signal to periodic data loss caused by frequency selective fading using symbol interleaver logic 56.

At this point, groups of bits have been mapped into symbols representing locations in an amplitude and phase constellation. Blocks of symbols are then processed by space-time block code (STC) encoder logic 58, which modifies the symbols in a fashion making the transmitted signals more resistant to interference and readily decoded at a mobile terminal 16. The control system 18 and/or baseband processor 20 will provide a mapping control signal to control STC encoding.

The symbol stream output by the STC encoder logic 58 is sent to pilot insertion logic 59 and then an IFFT processor 60, illustrated separately for each of understanding. Those skilled in the art will recognize that one or more processors may be used to provide such digital signal processing alone or in combination with other processing described herein. The IFFT processor 60 will preferably operate on the respective symbols using IDFT or like processing to effect an Inverse Fourier Transform. The output of the IFFT processor 60 provides symbols in the time domain. The time domain symbols are grouped into frames, which may be associated with prefix headers by like insertion logic 62. Each of the resultant signals is up-converted in the digital domain to an intermediate frequency and converted to an analog signal via the corresponding digital up-conversion (DUC) and digital-to-analog (D/A) conversion circuitry 64. The resultant (analog) signals are then simultaneously modulated at the desired RF frequency, amplified, and transmitted via the RF circuitry 66 and antenna 26.

Figure 5:
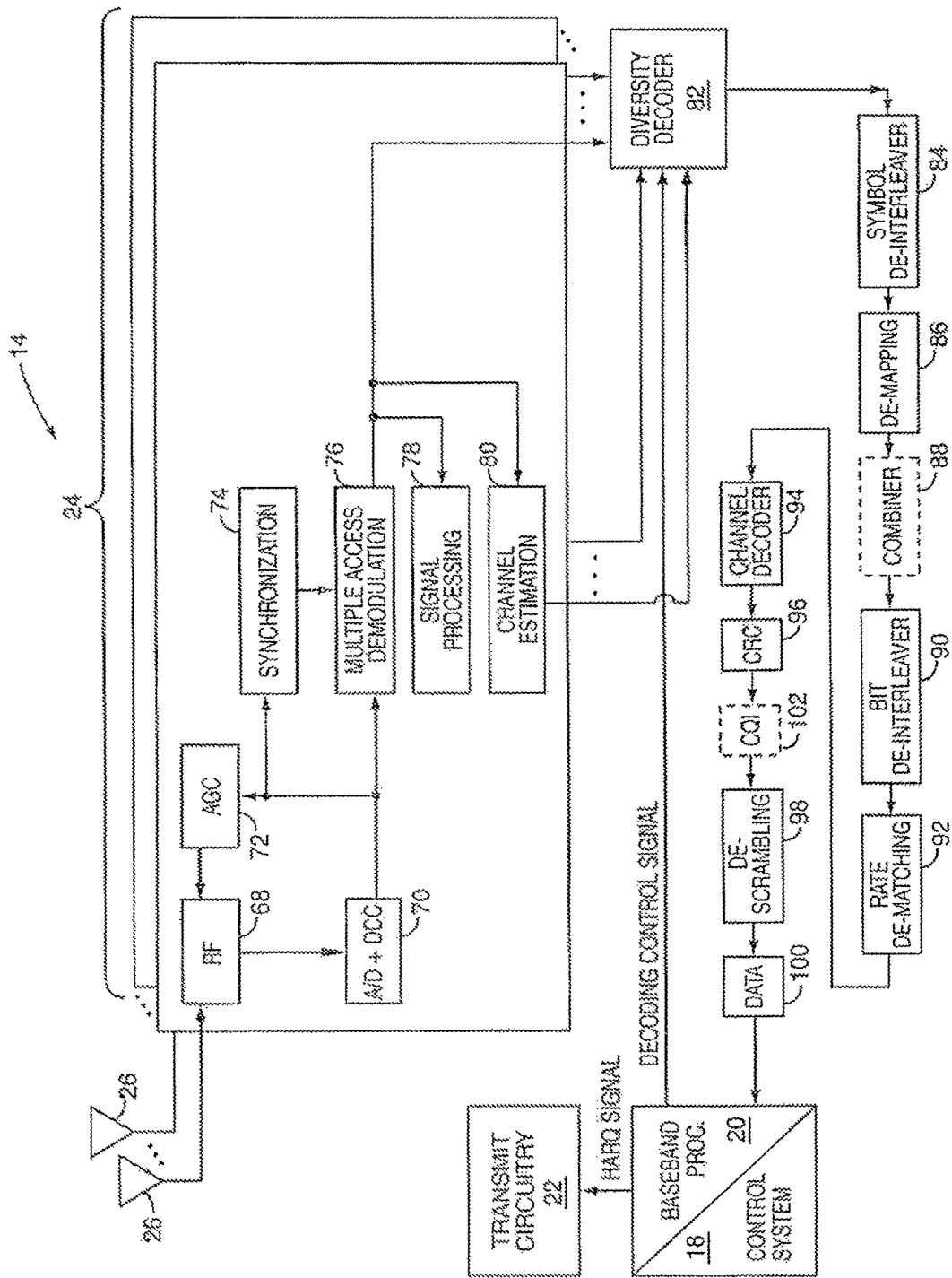
FIG. 5 is a more detail logical representation of a base station according to one embodiment of the present disclosure.

Reference is now made to FIG. 5 to illustrate reception of the transmitted signals by a base station 14. Upon arrival of the transmitted signals at each of the antennas 26 of the base station 14, the respective signals are demodulated and amplified by corresponding RF circuitry 68. For the sake of conciseness and clarity, only one of the multiple receives paths in the receiver is described and illustrated in detail. Analog-to-digital (A/D) conversion and downconversion circuitry (DCC) 70 digitizes and downconverts the analog signal for digital processing. The resultant digitized signal may be used by automatic gain control circuitry (AGC) 72 to control the gain of the amplifiers in the RF circuitry 68 based on the received signal level.

The digitized signal is also fed to synchronization circuitry 74 and a demodulation function 76, which will recover the incoming signal received at a corresponding antenna 26 at each receiver path. Note that the demodulation function 76 performs an FFT in order to recover the symbols transmitted on each of the sub-carrier frequencies. The synchronization circuitry 74 facilitates alignment or correlation of the incoming signal with the multiple access demodulation function 76 to aid recovery of the incoming signal, which is provided to a signaling processing function 78 and channel estimation function 80. The signal processing function 78 processes basic signaling and header information to provide information sufficient to generate a channel quality measurement, which may bear on an overall signal-to-noise ratio for the link, taking into account channel conditions and/or signal-to-noise ratios for each receive path.

The channel estimation function 80 for each receive path provides channel responses corresponding to channel conditions for use by a diversity decoder 82. The symbols from the incoming signal and channel estimates for each receive path are provided to the diversity decoder 82. The channel estimates provide sufficient channel response information to allow the diversity decoder 82 to decode the symbols according to the transmission and/or encoding used by the mobile terminal 16.

The recovered symbols are placed back in order using symbol de-interleaver logic 84, which corresponds to the symbol interleaver logic 56 of the mobile terminal 16. The de-interleaved symbols are then demodulated or de-mapped to a corresponding bitstream using de-mapping logic 86. Depending on the configuration of the receiver architecture, combiner logic 88, such a Chase combiner, which is well known in the art, may optionally be included to combine the energy associated with parallel receive channels to arrive at a soft decision for each bit or group of bits. The bits are then de-interleaved using bit de-interleaver logic 90, which corresponds to the bit interleaver logic 52 of the transmitter architecture. The de-interleaved bits are then processed by rate de-matching logic 92 and presented to channel decoder logic 94 to recover the initially scrambled data and the CRC checksum. Accordingly, CRC logic 96 removes the CRC checksum, checks the scrambled data in traditional fashion, and provides it to de-scrambling logic 98 for de-scrambling using the known base station de-scrambling code to recover the originally transmitted data 100.

A channel quality indicator (CQI) may be determined based on the recovered data. An additional or alternative CQI function 102 may be provided anywhere along the data recovery path (blocks 84 through 100) to monitor signal-to-noise ratios, error rates, and the like to derive information bearing on individual or overall channel quality. Additional information on one exemplary way to determine a CQI value is provided in co-assigned Provisional Application Ser. No. 60/329,511, filed Oct. 17, 2011, which is incorporated herein by reference in its entirety.

Figure 6:
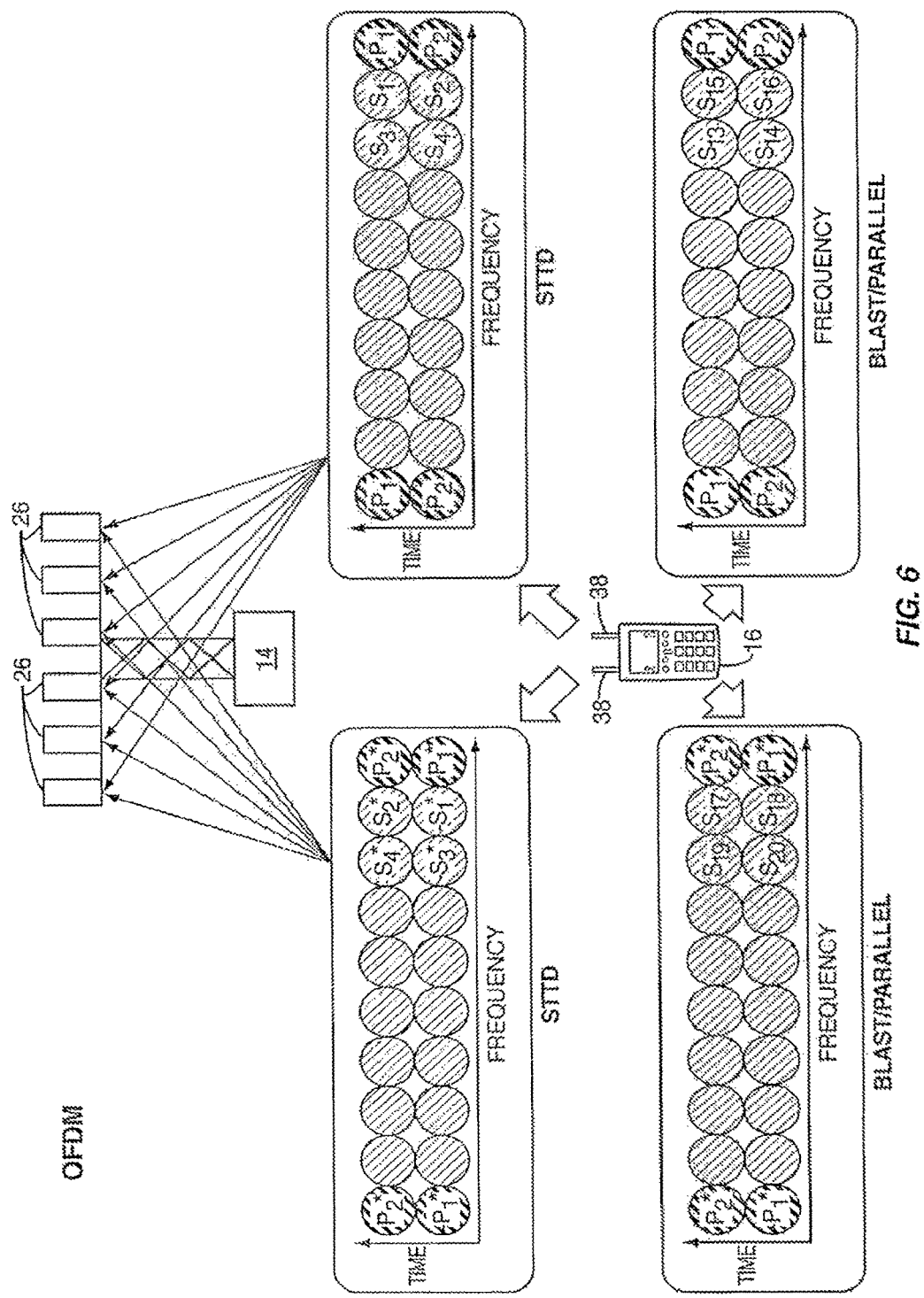
FIG. 6 illustrates a multiple input multiple output (MIMO) communication scheme according to the prior art.

Referring now to FIG. 6, an existing multiple input multiple output (MIMO) transmission scheme of an existing Nortel Networks Limited OFDM architecture is illustrated. In this infrastructure, a mobile terminal 16 has two transmission paths leading to two antennas 38, which will transmit signals to the antennas 26 of the base station 14. FIG. 6 illustrates two transmission techniques. The first uses space-time transmits diversity (coding), while the second uses Bell Labs layered Space-Time (BLAST) or like parallel transmission technique. In both techniques, a block of OFDM sub-carriers in the time-frequency domain, which may be referred to as a sub-channel, is allocated to a single mobile terminal 16 at any given time. Within this sub-channel, certain sub-carriers will be used as pilots, while others are used to transmit data. The pilot information is represented as $P_X$, which represents pilot data capable of being processed to provide a complex conjugate $P_X^*$ and a negative complex conjugate $-P_X^*$. Similarly, data for transmission by a data sub-carrier can be represented as the actual data $S_X$, a complex conjugate $S_X^*$, or a negative complex conjugate $-S_X^*$. Data, conjugates, and negative complex conjugates are used for space-time transmit diversity coding, as will be recognized by those skilled in the art.

In existing MIMO systems, the base station 14 will assign different pilot information $P_1$, $P_2$ and corresponding sub-carriers for transmitting the pilot information to the mobile terminal 16. In both the Space-Time Transmit Diversity (STTD) and BLAST transmission techniques, STTD coding is implemented across each of the transmission paths in the mobile terminal 16. As such, the pilot information is processed and provided in the sub-carriers assigned by the base station 14 for the group of sub-carriers, as illustrated. Further, any data to be transmitted to the base station 14 from the mobile terminal 16 is provided in all or select ones of the remaining sub-carriers in the group of sub-carriers using STTD coding wherein redundant versions of the data are coded and transmitted from the different antennas 38 of the mobile terminal 16, or using the BLAST technique wherein each antenna 38 transmits different data. Further information regarding STTD and BLAST techniques is provided in U.S. patent application Ser. No. 09/977,540 filed Oct. 15, 2001, Ser. No. 10/251,935 filed Sep. 20, 2002, Ser. No. 10/261,739 filed Oct. 1, 2002, and Ser. No. 10/263,268 filed Oct. 2, 2002, the disclosures of which are incorporated herein by reference in their entireties.

Providing a MIMO architecture with mobile terminals 16 having multiple transmit paths can increase channel capacity by allowing multiple users to share the same channels, increase data rates, or a combination thereof. Unfortunately, equipping mobile terminals 16 with multiple transmission paths significantly increases the cost and complexity of the mobile terminals 16.

Figure 7:
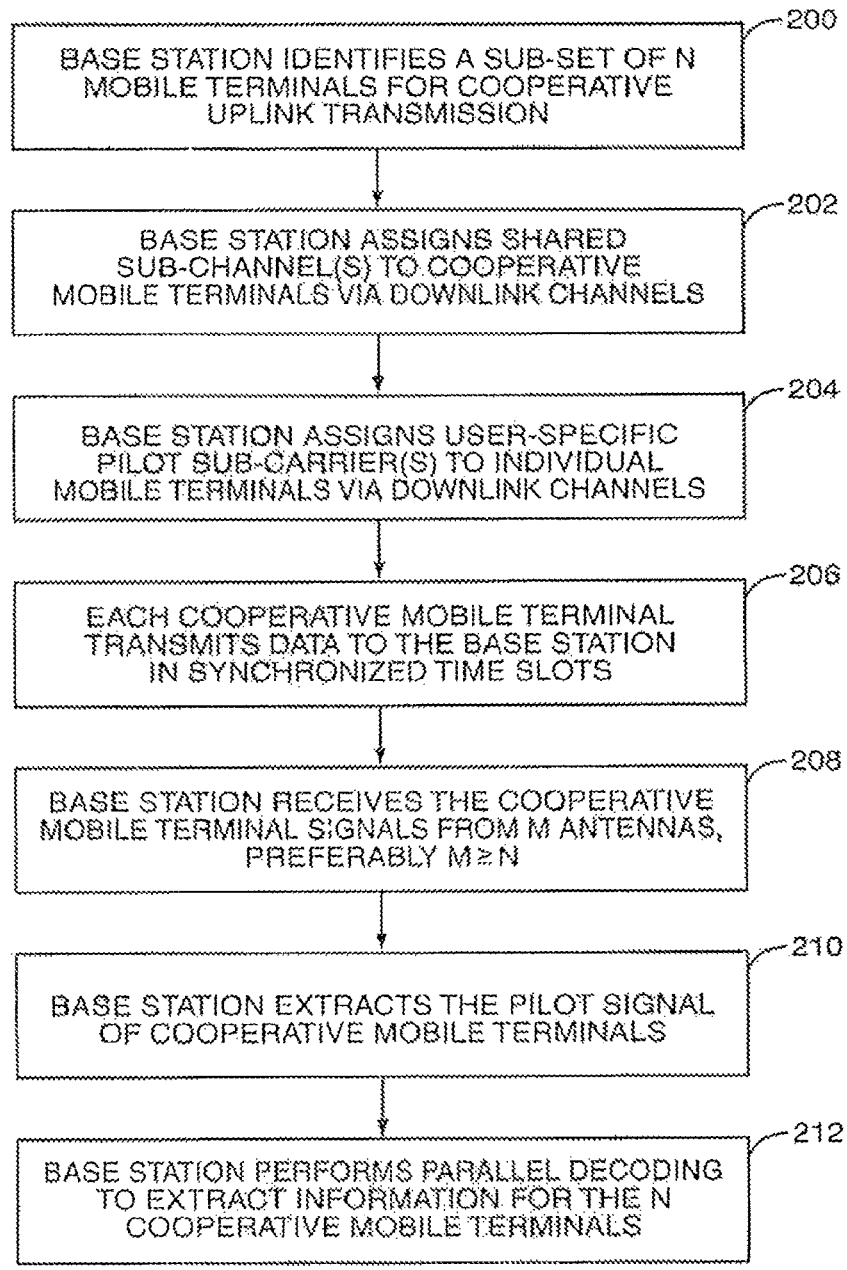
FIG. 7 is a flow diagram representing the basic operation of one embodiment of the present disclosure.

The present disclosure is related to a system allowing mobile terminals 16 to operate under the control of the base station 14 to provide a virtual MIMO environment. The flow diagram of FIG. 7 provides an overview of the present disclosure. Initially, the base station 14 identifies a sub-set of N mobile terminals 16 to cooperate with one another during uplink transmissions (block 200). While the discussion herein primarily focuses on the situation where N=2, any number of mobile terminals 16 may be identified to cooperate with one another during uplink transmission. Next, the base station 14 assigns one or more sub-channels, each including a number of sub-carrier frequencies, to the cooperating mobile terminals 16 via downlink channels (block 202). Note that the cooperating mobile terminals 16 will transmit over the sub-channels using the same sub-carrier frequencies. Next, the base station 14 assigns pilot sub-carrier frequencies within the assigned sub-channels to each of the cooperating mobile terminals 16 via the downlink channel (block 204).

Once the sub-channels and pilot sub-carriers are assigned, each mobile terminal 16 in the cooperating group transmits data to the base station 14 in synchronized time slots, which may be referred to as transmit time intervals (block 206). Again, note that the mobile terminals 16 in the cooperating group transmit over the same sub-channels using the same sub-carrier frequencies. The base station 14 will receive the transmitted signals from the mobile terminals 16 at each of its antennas 38 (block 208) and extract the pilot signals for each of the mobile terminals 16 to help identify the mobile terminals 16 transmitting information (block 210). Finally, the base station 14 will decode the received signals to extract the data or information transmitted by each of the cooperating mobile terminals 16 (block 212).

Figure 8:
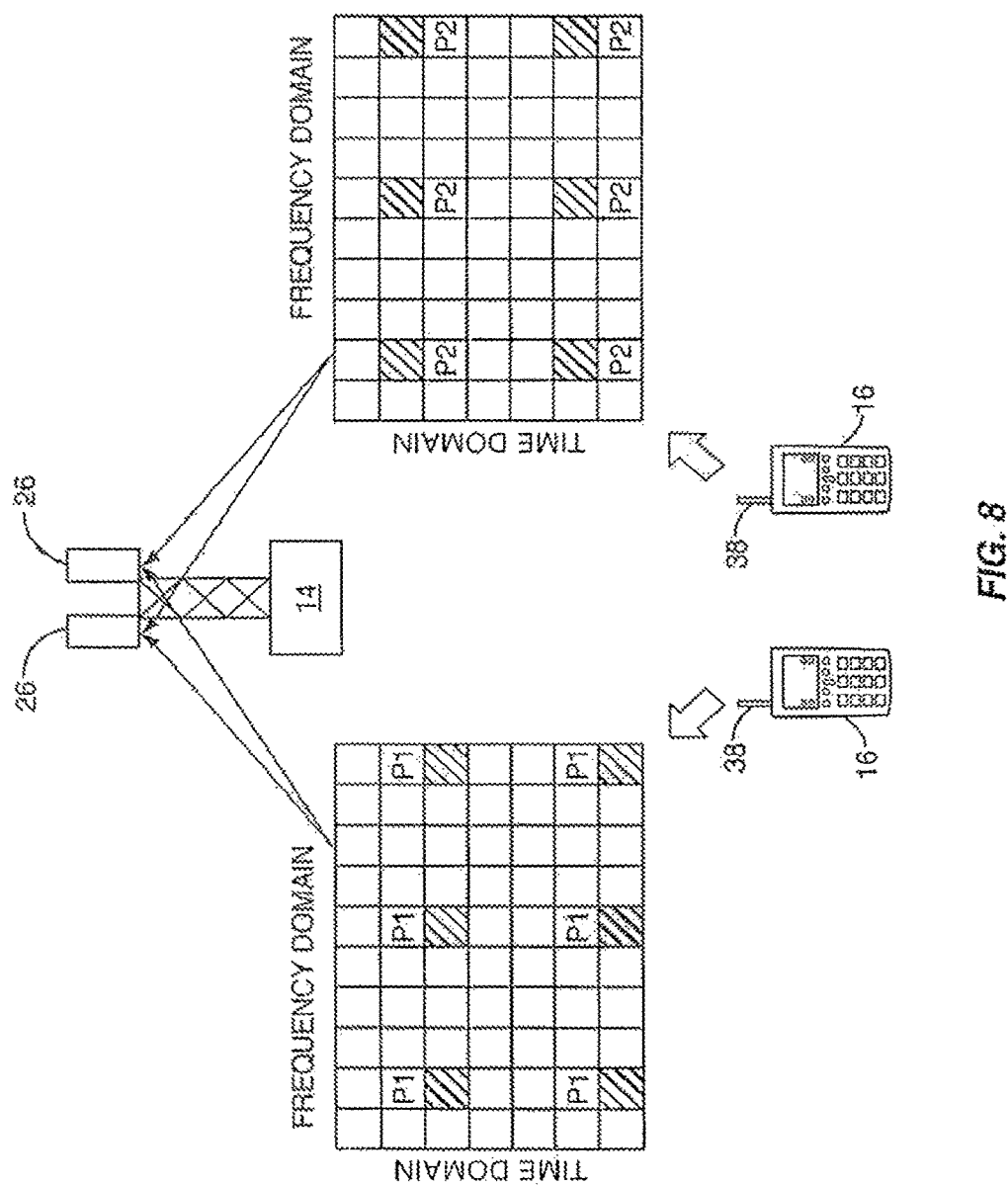
FIG. 8 illustrates an Orthogonal Frequency Division Multiplexing (OFDM) virtual MIMO environment according to the present disclosure.

Turning now to FIG. 8, a communication environment having two mobile terminals 16 cooperating with one another to provide virtual MIMO operation is illustrated. For the same sub-channel, each of the mobile terminals 16 transmits information via the same sub-carrier frequencies at the same time. Each mobile terminal 16 will transmit its own data, yet will use pilot information provided by the base station 14 to provide a virtual MIMO environment. In essence, the mobile terminals 16 will emulate a single user element having two transmission paths and two antennas 38 by transmitting data over the same group of sub-carriers and careful use of pilot placement. In particular, the illustrated sub-channel block includes ten sub-carriers over, for example, seven OFDM symbol time periods for a total of twenty Basic Access Channels (BACHs). The BACHs marked with $P_1$ and $P_2$ provide the pilot data for the cooperating mobile terminals 16. Note that one of the mobile terminals 16 does not transmit anything during the BACHs allocated for $P_1$ while the other of the mobile terminals 16 does not transmit anything during the BACHs allocated for $P_2$, as indicated by the shading of the corresponding BACHs. By ensuring that pilot signals for the cooperating mobile terminals 16 are transmitted using separate sub-carriers and separate OFDM symbol time periods, the pilot information provided by both of the cooperating mobile terminals 16 does not interfere with one another, and provides the necessary pilot information to allow decoding of the transmitted information as if it were simultaneously transmitted from a single mobile terminal 16 having multiple transmission paths and antennas 38.

Figure 9:
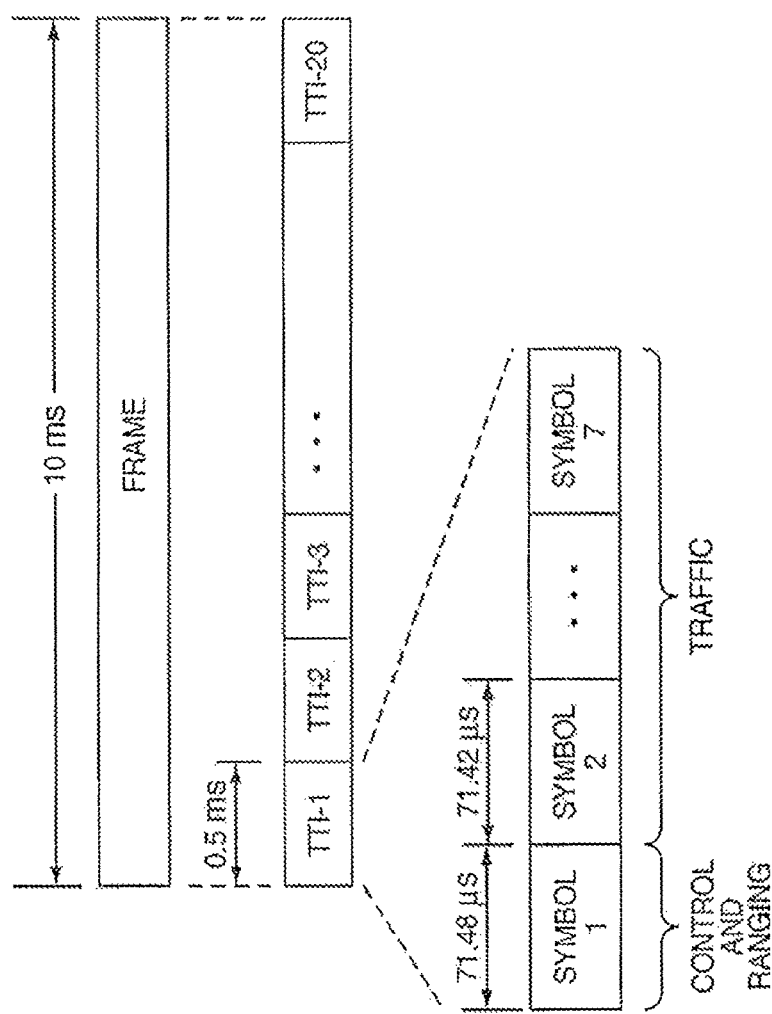
FIG. 9 illustrates an exemplary uplink frame structure.

FIG. 9 illustrates a basic uplink frame structure for communication between the mobile terminals 16 and the base station 14. In this example, the frame includes twenty transmit time intervals (TTIs), each including seven OFDM symbol time periods. The present disclosure provides a system and method for identifying a subset of N mobile terminals 16 to cooperate with one another during each TTI. This process is referred to herein as scheduling.

The present disclosure provides both random and channel aware orthogonal scheduling techniques for identify a subset N mobile terminals 16 for each of the TTIs in each uplink frame. The discussion below focuses on identifying two mobile terminals 16 (N=2), each having one transmit antenna, to cooperate for virtual MIMO operation. However, the present disclosure is not limited thereto. As will be apparent to one of ordinary skill in the art upon reading this disclosure, the various embodiments discussed below may be adapted to provide scheduling for groupings of more than two mobile terminals 16 and to accommodate mobile terminals having more than one transmit path and one antenna.

Figure 10A:
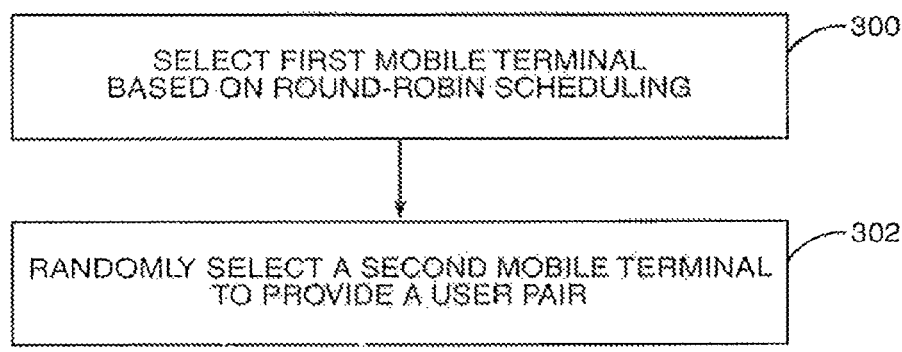
FIGS. 10A and 10B illustrate two exemplary embodiments of Random User Scheduling (RUS) according to one embodiment of the present disclosure.
Figure 10B:
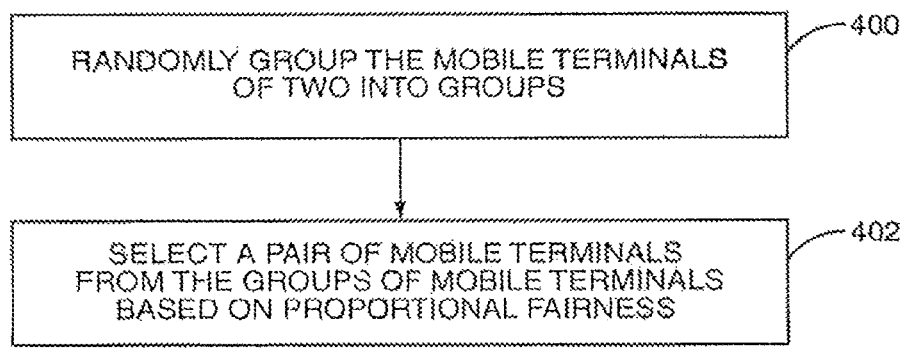

FIGS. 10A and 10B illustrate two exemplary embodiments of Random User Scheduling (RUS) according to one embodiment of the present disclosure. Referring to FIG. 10A, a first mobile terminal 16 may be selected by the base station 14 from the group of mobile terminals 16 served by the base station 14 based on round-robin scheduling (step 300). As used herein, "round-robin" scheduling is defined as a scheduling algorithm that assigns time slices, which may be uplink time slots, to each mobile terminal 16 served by the base station 14 in equal portions and in order, wherein all mobile terminals 16 have the same priority.

A second mobile terminal 16 to be paired with the first mobile terminal 16 for virtual MIMO operation may then be selected randomly (step 302). The base station 14 then provides the one or more sub-channels and pilot sub-carrier frequencies assigned to the mobile terminals 16 of the selected user pair to the mobile terminals 16 of the selected user pair, as discussed above with respect to FIG. 7. This process may be repeated for each TTI. Note that there may be a delay between the time at which the base station 14 selects the user pair and the uplink transmission by the selected user pair. Thus, for example, the base station 14 may operate to select a user pair for a fourth TTI (TTI-4) of an uplink frame during a first TTI (TTI-1) of the uplink frame.

Referring to FIG. 10B, base station 14 may randomly pair the mobile terminals 16 served by the base station 14 into groups of two (step 400). The base station 14 may then select one of the groups of the mobile terminals 16 as a selected user pair for virtual MIMO operation based on proportional fairness scheduling (step 402). As an example, the base station 14 may calculate a ratio $\rho_{x,y}$ for each pair of mobile terminals 16 according to the equation:

$$\rho_{x,y} = \frac{R(x)}{T(x)} + \frac{R(y)}{T(y)},$$

Where x and y are identifiers for the mobile terminals 16 in the pair, R is a transmission rate for the mobile terminal 16, and T is an average throughput for the mobile terminal 16. Both the transmission rate and the average throughput for the mobile terminals 16 are known by the base station 14, as will be apparent to one of ordinary skill in the art. The pair of mobile terminals 16 having the lowest ratio $\rho_{x,y}$ may then be selected as the selected user pair.

The base station 14 then provides the one or more sub-channels assigned to the selected user pair and the pilot sub-carrier frequencies to the mobile terminals 16 forming the selected user pair, as discussed above with respect to FIG. 7. This process may be repeated for each TTI. Again, note that there may be a delay between the time at which the base station 14 selects the user pair and the uplink transmission by the selected user pair. Thus, for example, the base station 14 may operate to select a user pair for a fourth TTI (TTI-4) of an uplink frame during a first TTI (TTI-1) of the uplink frame.

Figure 11A:
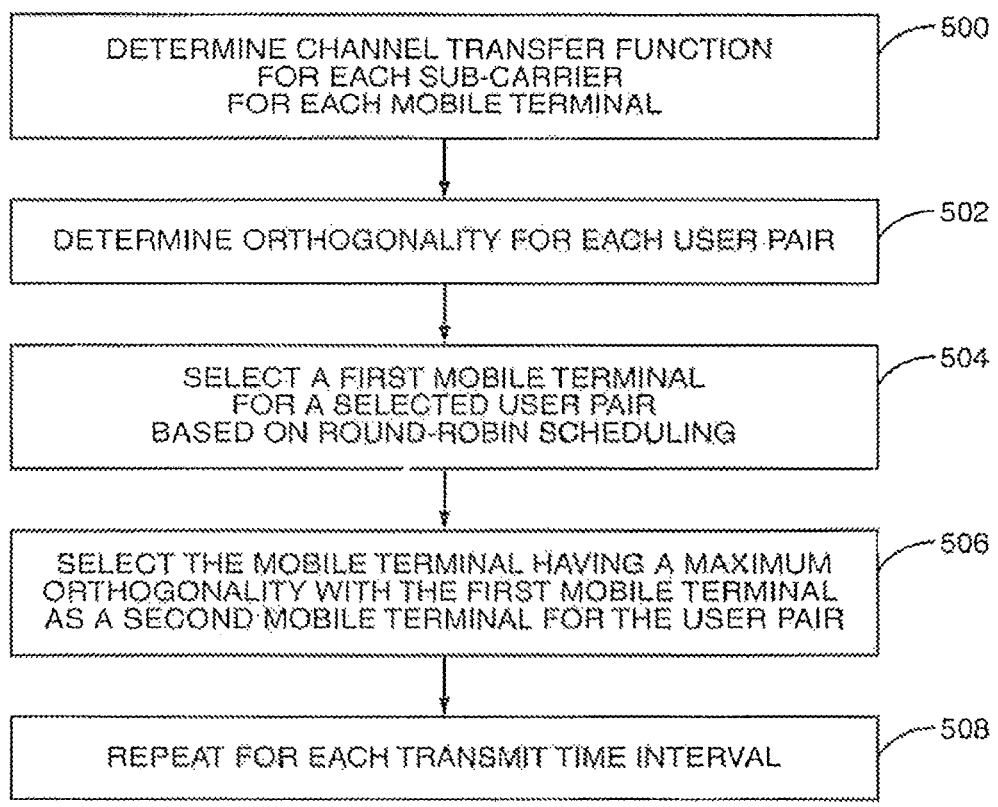
FIGS. 11A-11C illustrate exemplary embodiments of Channel Aware Orthogonal Scheduling (CAOS) according to one embodiment of the present disclosure.
Figure 11B:
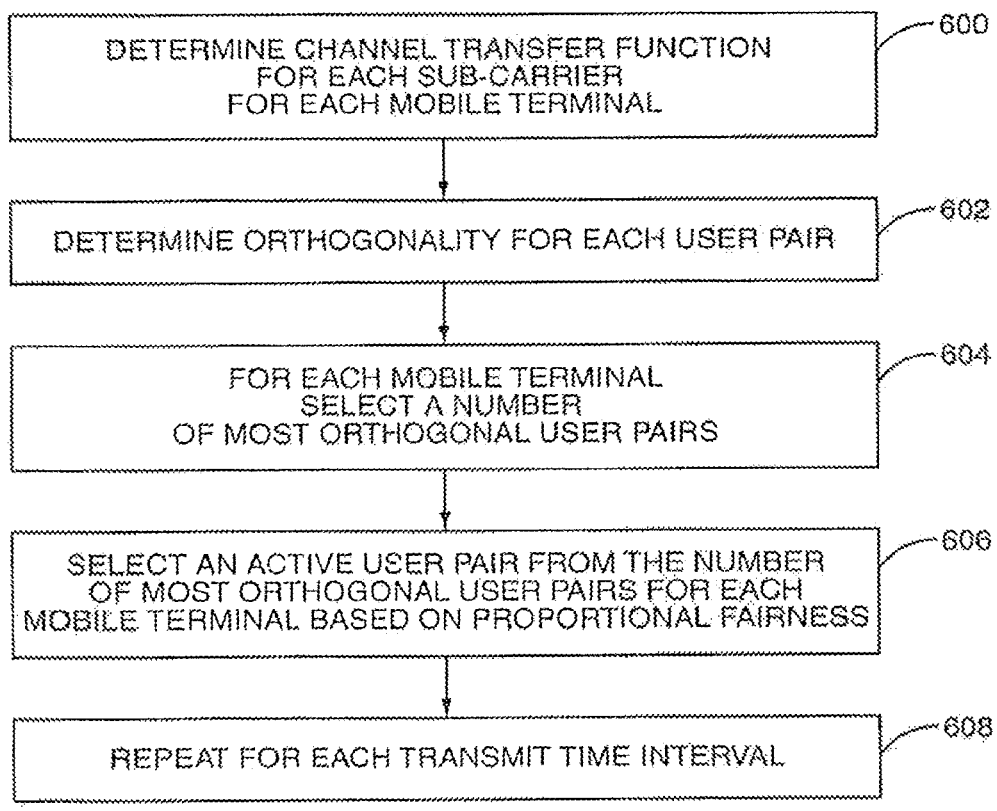

FIGS. 11A and 11B illustrate two exemplary embodiments of Channel Aware Orthogonal Scheduling (CAOS) according to one embodiment of the present disclosure. Referring to FIG. 11A, the base station 14 first determines a channel transfer function for each sub-carrier for each mobile terminal 16 within the coverage area of the base station 14 (step 500). More specifically, in this embodiment, the mobile terminals 16 provide sounding channels using, for example, the first OFDM symbol in each TTI of the uplink frame. For example, the entire uplink frequency brand may be divided into 600 sub-carrier frequencies. The sub-carrier frequencies may be divided among the mobile terminals 16 within the coverage area of the base station 14. If there are twenty mobile terminals 16 within the coverage area of the base station 14, each of the mobile terminals 16 may be assigned thirty sub-carriers to be used as a sounding channel during the first OFDM symbol period. Note that the thirty sub-carriers assigned to each of the mobile terminals 16 are distributed throughout the uplink frequency band. Then, for each of the mobile terminals 16, the base station 14 may use interpolation to determine a channel transfer function for each sub-carrier in the uplink frequency band.

Next, the base station 14 may determine the orthogonality for each user pair (step 502). More specifically, for each pair of mobile terminals 16, the base station 14 may determine the correlation of the channel transfer functions for each sub-carrier in each sub-channel assigned to the mobile terminals 16 in the user pair. The correlations for each sub-carrier in each sub-channel assigned to the mobile terminals 16 in the user pair may be averaged to determine an average correlation. As will be apparent to one of ordinary skill in the art, a low average correlation corresponds to high orthogonality.

As an example, the orthogonality of a user pair may be determined based on a predetermined formula. First, the channel matrix for a 2×2 MIMO configuration is:

$$F_n = H_n^H H_n = \begin{bmatrix} f_{11} & f_{12} \\ f_{21} & f_{22} \end{bmatrix}$$

where $H_n$ is the complex spatial multiplexing channel for sub-carrier n for the user pair and the superscript H denotes conjugate and transpose. As a first example, a value ($D_n$) indicative of orthogonality may be computed using an orthogonal formula represented as:

$$D_n = \frac{(f_{11} + f_{22}) - (f_{12} + f_{21})}{\text{tr}(F_n)},$$

where tr(A) is the trace of A. As a second example, the value ($D_n$) indicative of orthogonality may be computed using a determinant formula represented as:

$$D_n = \frac{\det(F_n)}{\text{tr}(F_n)},$$

where det(A) is the determinant of A. As a third example, the value ($D_n$) indicative of orthogonality may be computer as:

$$D_n = \log_2[\det(I+F_n)],$$

where I is the identity matrix.

Using any of these formulas, orthogonality of the user pair may be determined based on computing the average $D_n$ over each sub-carrier in each sub-channel assigned to the mobile terminals 16 in the user pair. For each user pair, the average $D_n$ may be computed according to the equation:

$$\overline{D} = \frac{1}{N}\sum_{n=1}^{N} D_n,$$

where N is the number of sub-carriers over all sub-channels assigned to the mobile terminals 16 in the user pair.

Once the orthogonality of each user pair is determined, the base station may select a first mobile terminal 16 for a selected user pair based on round robin scheduling (step 504). Next, the base station 14 may select the mobile terminal 16 having a greatest orthogonality with the first mobile terminal 16 as a second mobile terminal 16, thereby forming a selected user pair (step 506). For example, the base station 14 may examine the average $D_n$ values for each pairing of the first mobile terminal 16 with another mobile terminal 16. From these average $D_n$ values, a maximum average $D_n$ value is determined. The mobile terminal 16 associated with the maximum average $D_n$ value is selected as the second mobile terminal 16 for the selected user pair.

Alternatively, the base station 14 may select a number M of the mobile terminals 16 having the greatest orthogonality of the first mobile terminal 16. Then, the base station 14 may select one of the number M of mobile terminals 16 as the second mobile terminal 16 for the selected user pair based on proportional fairness.

The base station 14 then provides the one or more sub-channels assigned to the selected user pair and the pilot sub-carrier frequencies to the mobile terminals 16 forming the selected user pair, as discussed above with respect to FIG. 7. Steps 500-506 may be repeated for each TTI (step 508). Note that there may be a delay between the time at which the base station 14 performs steps 500-506 and the uplink transmission by the selected user pair. For example, the base station 14 may perform steps 500-506 during a first TTI (TTI-1) of a frame for an uplink transmission and instruct the selected user pair to transmit during a fourth TTI (TTI-4) of the frame.

A second exemplary embodiment of Channel Aware Orthogonal Scheduling (CAOS) is illustrated in FIG. 11B. This embodiment is similar to that in FIG. 11A but uses proportional fairness scheduling rather than round robin scheduling. The base station 14 first determines a channel transfer function for each sub-carrier for each mobile terminal 16 within the coverage area of the base station 14 (step 600). More specifically, in this embodiment, the mobile terminals 16 provide sounding channels using, for example, the first OFDM symbol in each TTI of the uplink frame. For example, the entire uplink frequency band may be divided into 600 sub-carrier frequencies. The sub-carrier frequencies may be divided among the mobile terminals 16 within the coverage area of the base station 14. If there are twenty mobile terminals 16 within the coverage area of the base station 14, each of the mobile terminals 16 may be assigned thirty sub-carriers to be used as a sounding channel. Note that the thirty sub-carriers assigned to each of the mobile terminals 16 are distributed throughout the uplink frequency band. Them, for each of the mobile terminals 16, the base station 14 may use interpolation to determine a channel transfer function for each sub-carrier in the uplink frequency band.

Next, the base station 14 may determine the orthogonality for each user pair (step 602). More specifically, for each pair of mobile terminals 16, the base station 14 may determine the correlation of the channel transfer functions for each sub-carrier in each sub-channel assigned to the mobile terminals 16 in the user pair. The correlations for each sub-carrier in each sub-channel assigned to the mobile terminals 16 in the user pair may be averaged to determine an average correlation. As will be apparent to one of ordinary skill in the art, a low average correlation corresponds to high orthogonality.

As an example, the orthogonality of a user pair may be determined based on a predetermined formula, as discussed above. The orthogonal formula may be represented as:

$$D_n = \frac{(f_{11} + f_{22}) - (f_{12} + f_{21})}{\text{tr}(F_n)},$$

where tr(A) is the trace of A. The determinant formula may be represented as:

$$D_n = \frac{\det(F_n)}{\text{tr}(F_n)},$$

where det(A) is the determinant of A. Lastly, the value ($D_n$) indicative of orthogonality may be computed as:

$$D_n = \log_2[\det(I+F_n)],$$

where I is the identity matrix. Using any of these formulas, orthogonality of the user pair may be determined based on computing the average $D_n$ over each sub-carrier in each sub-channel assigned to the mobile terminals 16 in the user pair. For each user pair, the average $D_n$ may be computed according to the equation:

$$\overline{D} = \frac{1}{N}\sum_{n=1}^{N} D_n,$$

where N is the number of sub-carriers over all sub-channels assigned to the mobile terminals 16 in the user pair.

Once the orthogonality for each user pair is determined, the base station may select a number of most orthogonal user pairs for each mobile terminal 16 (step 604). For example, for each mobile terminal 16, two pairings having the greatest orthogonality may be selected. Then, a user pair is selected from the most orthogonal pairs for each mobile terminal 16 based on proportional fairness scheduling (step 606). As an example, the base station 14 may calculate a ratio $\rho_{x,y}$ for each of the most orthogonal pairs for each of the mobile terminals 16 according to the equation:

$$\rho_{x,y} = \frac{R(x)}{T(x)} + \frac{R(y)}{T(y)},$$

wherein x and y are identifiers for the mobile terminals 16 in the pair, R is a transmission rate for the mobile terminal 16, and T is an average throughput for the mobile terminal 16. Both the transmission rate and the average throughput for the mobile terminals 16 are known by the base station 14, as will be apparent to one of ordinary skill in the art. The pair of mobile terminals 16 having the lowest ratio $\rho_{x,y}$ may then be selected as the selected user pair.

The base station 14 then provides the one or more sub-channels assigned to the selected user pair and the pilot sub-carrier frequencies to the mobile terminal 16 forming the selected user pair, as discussed above with respect to FIG. 7. Steps 600-606 may be repeated for each TTI (step 608). Note that there may be delay between the time at which the base station 14 performs steps 600-606 and the uplink transmission by the selected user pair. For example, the base station 14 may perform steps 600-606 during a during a first TTI (TTI-1) of a frame for an uplink transmission and instruct the selected user pair to transmit during a fourth TTI (TTI-4) of the frame.

Figure 11C:
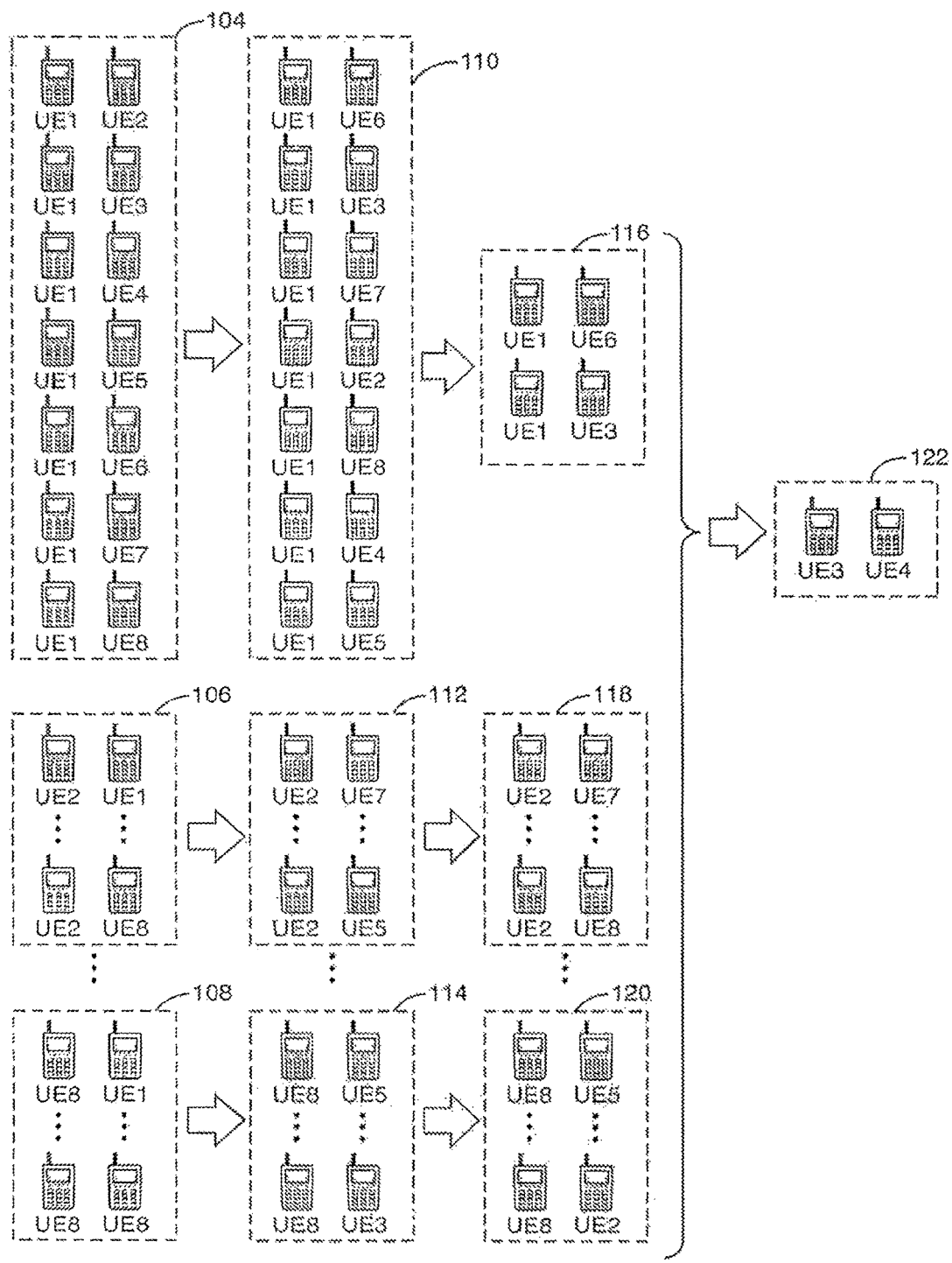

FIG. 11C is a block diagram illustrating the process of FIG. 11B. In this example, there are eight mobile terminals 16 identified as UE1-UE8. After determining the channel transfer function for each sub-carrier for each mobile terminal 16, the orthogonality for each user pair is determined. More specifically, the orthogonality for each user pairing for the mobile terminal UE1 is determined, as indicated by dashed box 104. Likewise, the orthogonality for each user pairing for the mobile terminals UE2-U3E8 is determined, as indicated by dashed boxes 106-108. While this example includes eight mobile terminals UE1-UE8, the present disclosure is equally applicable to any number of two or more mobile terminals 16. Next, the user pairings for the mobile terminals UE1-U38 may be sorted in ascending order based on orthogonality, as indicated by dashed boxes 110-114. Then, for each of the mobile terminals UE1-UE8, a number of most orthogonal pairings are selected, as indicated by dashed boxes 116-120. In this example, the two most orthogonal pairings for each of the mobile terminals UE1-UE8 are selected. However, the present disclosure is not limited thereto. Then, based on proportional fairness scheduling, one of the user pairs from the most orthogonal pairings for each of the mobile devices UE1-UE8 is selected as the selected user pair, as indicated by dashed box 122. In this example, the mobile terminals UE3 and UE4 are selected as the selected user pair.

In either of the exemplary embodiments illustrated in FIGS. 11A and 11B, the orthogonality of a particular mobile terminal 16 may be such that it is rarely, and potentially, never paired with another mobile terminal 16. As a result, the throughput for the mobile terminal 16 may be lower than desired. If the base station 14 identifies such a mobile terminal 16, the base station 14 may instruct the mobile terminal 16 to artificially adjust a phase of the sub-carrier waveforms transmitted by the mobile terminal 16 in order to improve the orthogonality of the mobile terminal 16 with others of the mobile terminals 16 served by the base station 14. As an example, the mobile terminal 16 may adjust the phase of the sub-carrier waveforms transmitted by the mobile terminal 16 using a pre-determined pattern or waveform. A number of pre-determined patterns or waveforms may be stored at the mobile device 16.

In operation, the base station 14 may communicate with the mobile terminal 16 by, for example, an iterative process until the orthogonality of the mobile terminal 16 with one or more other mobile terminals 16 is improved. As a result, the number of pairings of the mobile terminal 16 with other mobile terminals 16 is increased, thereby increasing the throughput of the mobile terminal 16.

In one embodiment, the Channel Aware Orthogonal Scheduling (CAOS) of the present disclosure may be implemented to include Adaptive Orthogonal Scheduling (AOS). More specifically, one or more mobile terminals 16 may experience a very low geometry or long term Signal-to-Noise Ratio (SNR), which causes poor user coverage. Additionally, the orthogonality of a particular mobile terminal 16 may be such that it is rarely, and potentially, never paired with another mobile terminal 16. If this happens, the aggregated throughput for that mobile terminal 16 may be much lower than a predetermined minimum requirement.

In order to address these potential issues, Adaptive Orthogonal Scheduling (AOS) may be used. In essence, the base station 14 periodically performs an analysis and groups the mobile terminals 16 into two groups: a virtual MIMO group and a Single Input Multiple Output (SIMO) group. The SIMO group may also be referred to as a 1×2 diversity group. More specifically, initially, each of the mobile terminals 16 may begin in the virtual MIMO group. The base station 14 may periodically examine the geometry or long term SNR and the aggregate throughput for each of the mobile terminals 16. If one or more of these criteria for a mobile terminal 16 does not meet minimum requirements, the base station 14 may place the mobile terminal 16 in the SIMO group.

Thereafter, the base station 14 may perform scheduling for both the SIMO group and the virtual MIMO group. For example, if the round-robin scheme of FIG. 11A is used, the base station 14 selects a first mobile terminal 16 based on round robin scheduling. If the first mobile terminal 16 is in the SIMO group, then a second mobile terminal 16 is not selected and the first mobile terminal 16 is scheduled to provide a single data transmission with receive diversity during an upcoming TTI. If the first mobile terminal 16 is in the virtual MIMO group, then the base station 14 proceeds as discussed above with respect to FIG. 11A to select a second mobile terminal 16 to provide a selected user pair.

Figure 12:
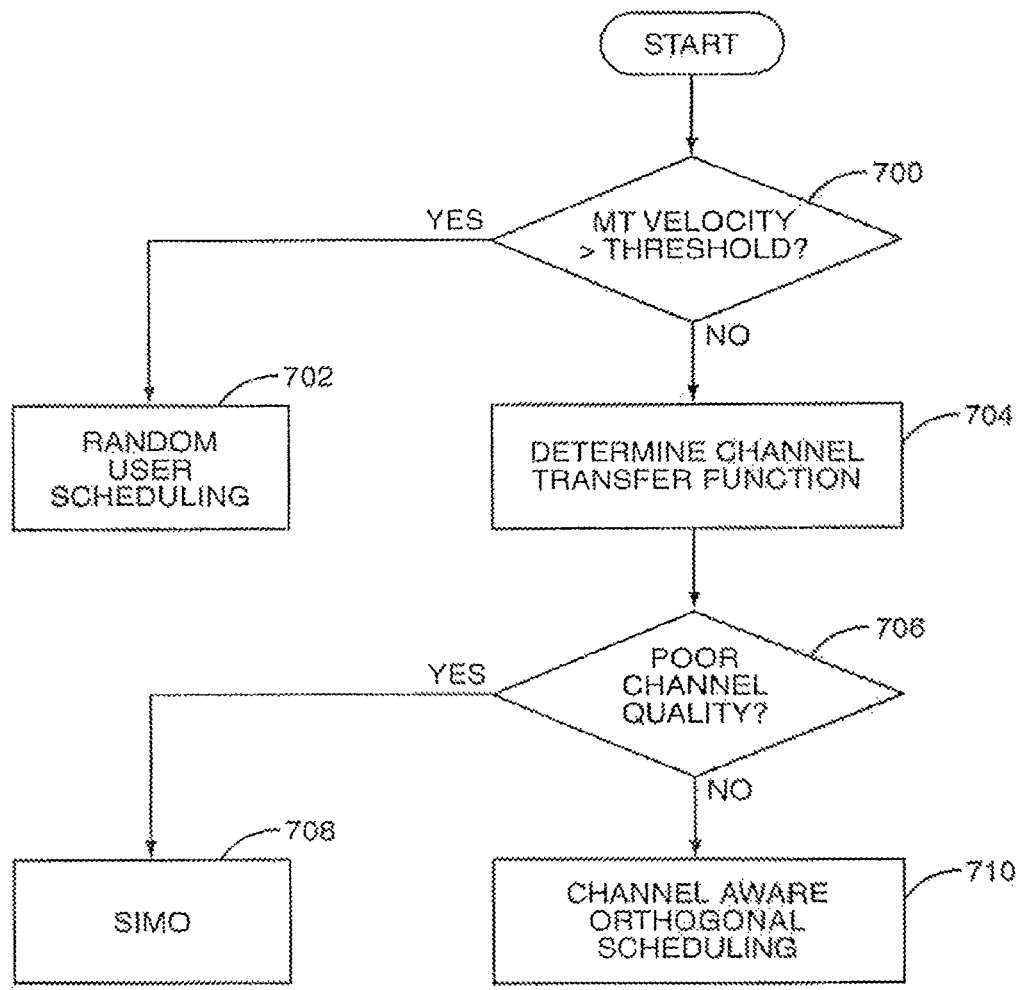
FIG. 12 is a flow chart illustrating a virtual MIMO implementation according to one embodiment of the present disclosure.

FIG. 12 is a flow chart illustrating an exemplary virtual MIMO implementation, wherein the base station 14 groups the mobile terminals 16 into one of three groups: a Random User Scheduling (RUS) group, a SIMO group, and a Channel Aware Orthogonal Scheduling (CAOS) group. This process is performed by the base station 14 periodically for each of the mobile terminals 16. First, a velocity of the mobile terminal 16 is compared to a predetermined threshold such as, for example, 30 km/h (step 700). The velocity of the mobile terminal 16 may be determined, for example, by a Global Positioning System (GPS) receiver associated with or incorporated into the mobile terminal 16. If the velocity of the mobile terminal 16 is above the predetermined threshold, Channel Aware Orthogonal Scheduling (CAOS) may not be desirable since the channel transfer functions for each of the sub-carriers for the mobile device 16 may be rapidly changing. Thus, if the velocity of the mobile terminal 16 is greater than the predetermined threshold, the base station 14 may place the mobile terminal 16 in the RUS group (step 702).

If the velocity of the mobile terminal 16 is not greater than the predetermined threshold, the base station 14 may then determine the transfer function for each of the sub-carriers within each of the sub-channels assigned to the mobile terminal 16 (step 704). These transfer functions may be known by the base station 14 due to a recent calculation of the transfer functions for scheduling. Alternatively, the base station 14 may compute the transfer functions as discussed above with the respect to FIGS. 11A and 11B.

The base station 14 then determines whether a channel quality associated with the mobile terminal 16 is poor based on the transfer functions (step 706). The channel quality for the mobile terminal 16 may be determined to be poor when, for example, a predetermined percentage of the sub-carriers in the sub-channels assigned to the mobile terminal 16 are experiencing significant interference. If the channel quality is poor, the base station 14 places the mobile terminal 16 in the SIMO group, which may alternatively be referred to a 1×2 diversity group (step 708). If the channel quality is not poor, the base station 14 places the mobile terminal 16 in the CAOS group (step 710). Note that all of the mobile terminals 16 may initially be placed either the RUS group or the CAOS group for virtual MIMO operation, and the base station 14 may thereafter periodically perform steps 700-710 to move the mobile terminals 16 to other groups if needed or desired.

At this point, the base station 14 performs scheduling based on the grouping of the mobile terminals 16. For example, if a round-robin scheme similar to that in FIG. 11A is desired, the base station 14 may select a first mobile terminal 16 is in the SIMO group, then the base station 14 does not select a second mobile terminal 16 and the first mobile terminal 16 is scheduled to transmit in an upcoming TTI with 1×2 diversity. If the first mobile terminal 16 is in the RUS group, the base station 14 randomly selects the second mobile terminal 16 for the user pair, and the user pair is scheduled to transmit in an upcoming TTI. Note that for RUS, the base station 14 does not need to determine orthogonality, thereby reducing computational complexity. If the first mobile terminal 16 is in the CAOS group, the base station 14 selects the second mobile terminal 16 is based on orthogonality, as described above with respect to steps 500-506 of FIG. 11A.

The present disclosure provides substantial opportunity for variation without departing from the spirit and scope of the present disclosure. For example, while the discussion above focuses on OFDM, the present disclosure is equally applicable to other modulation schemes such as, but not limit to, SC-FDMA, which is sometimes referred to as DFT-spread OFDM, as will be apparent to one having ordinary skill in the art. As another example, while the scheduling embodiments described above focus on a virtual MIMO environment formed by two mobile terminals 16 each having a single transmit path and a single antenna, the present disclosure is not limited thereto. As will be apparent to one of ordinary skill in the art, the present disclosure may be adapted to provide scheduling in a virtual MIMO environment wherein more than two mobile terminals 16 are grouped to provide virtual MIMO operation. In addition, the present disclosure may be adapted to provide scheduling in a virtual MIMO environment wherein two or more mobile terminals 16 are grouped to provide virtual MIMO operation and at least one of the mobile terminals 16 has more than one transmit path and antenna.

Those skilled in the art will recognize improvements and modifications to the preferred embodiments of the present disclosure. All such improvements and modifications are considered within the scope of the concepts disclosed herein and the claims that follow.

What is claimed is:

1. An apparatus for scheduling uplink transmissions, the apparatus comprising:
at least one storage device; and
a processor configured to execute instructions stored on the at least one storage device such that when executed, cause the processor to:
identify a select group of mobile terminals for cooperative uplink transmission with one another, the group of mobile terminals being selected from a plurality of mobile terminals, wherein the group of mobile terminals are identified based on orthogonality of at least one channel transfer function for the plurality of sub-carriers;
assign at least one sub-channel to be simultaneously used by each mobile terminal in the group of mobile terminals, the at least one sub-channel comprising one or more sub-carriers selected from a plurality of sub-carriers; and
schedule at least one mobile terminal from the plurality of mobile terminals for a single input multiple output (SIMO) transmission rather than cooperative uplink transmission, wherein the at least one mobile terminal is selected from the plurality of mobile terminals based on a channel quality associated with the at least one mobile terminal, and wherein the at least one mobile terminal is scheduled for the SIMO transmission based on determining that the channel quality is below a predetermined threshold.

2. The apparatus of claim 1, wherein the group of mobile terminals are scheduled for cooperative uplink transmission based on determining that mobile terminals within the group have channel transfer functions that are orthogonal to each other.

3. The apparatus of claim 1, wherein the processor is further configured to assign different pilot signals for each mobile terminal in the group of mobile terminals.

4. The apparatus of claim 1, wherein the processor is further configured to receive sounding signals from each mobile terminal in the group of mobile terminals.

5. The apparatus of claim 4, wherein the processor is further configured to receive pilot signals from each mobile terminal in the group of mobile terminals.

6. The apparatus of claim 1, wherein the processor is further configured to remove a mobile terminal from the group of mobile terminals based on a performance criteria.

7. The apparatus of claim 1, wherein, in order to identify the group of mobile terminals, the processor is further configured to:
select a first mobile terminal from the plurality of mobile terminals based on round-robin scheduling; and
select a potential group of mobile terminals including the first mobile terminal based on orthogonality of channel transfer functions for one or more mobile terminals within the plurality of mobile terminals.

8. The apparatus of claim 1, wherein the processor is further configured to identify the group of mobile terminals based on proportional fairness scheduling.

9. The apparatus of claim 8, wherein, in order to identify the group of mobile terminals based on proportional fairness scheduling, the processor is further configured to:
determine proportional fairness values for one or more mobile terminals selected from the plurality of mobile terminals, each of the proportional fairness values being a sum of ratios of transmission rates and average throughputs for the one or more mobile terminals.

10. The apparatus of claim 1, wherein the processor assigns the at least one sub-channel to be simultaneously used by each mobile terminal in the group of mobile terminals during a common uplink transmit time interval.

11. The apparatus of claim 1, wherein the processor is further configured to instruct a first mobile terminal in the group of mobile terminals to artificially rotate a phase of sub-carrier waveforms transmitted by the first mobile terminal such that a channel transfer function for the first mobile terminal becomes more orthogonal with a channel transfer function for a second mobile terminal in the group of mobile terminals.

12. The apparatus of claim 1, wherein the processor is further configured to form the group of mobile terminals by selecting a first mobile terminal and one or more mobile terminals for cooperative uplink transmission with the first mobile terminal, the first mobile terminal being selected based on round-robin scheduling and the one or more mobile terminals being selected based on channel aware orthogonal scheduling.

13. The apparatus of claim 1, wherein the processor is further configured to schedule a second group of mobile terminals from the plurality of mobile terminals for random user scheduling (RUS), the second group of mobile terminals being identified based on a velocity of each mobile terminal in the second group.

14. A method for scheduling uplink transmissions, the method comprising:
  identifying a group of mobile terminals for cooperative uplink transmission with one another, wherein the group of mobile terminals are selected from a plurality of mobile terminals;
  assigning at least one sub-channel to be simultaneously used by each mobile terminal in the group of mobile terminals, the at least one sub-channel comprising one or more sub-carriers selected from a plurality of sub-carriers; and
  scheduling at least one mobile terminal from the plurality of mobile terminals for a single input multiple output (SIMO) transmission rather than cooperative uplink transmission,
  wherein the group of mobile terminals are identified based on orthogonality of at least one channel transfer function for the plurality of sub-carriers, wherein the at least one mobile terminal is selected from the plurality of the mobile terminals based on a channel quality associated with the at least one mobile terminal, and wherein the at least one mobile terminal is scheduled for the SIMO transmission based on determining that the channel quality is below a predetermined threshold.

15. The method of claim 14, further comprising assigning different pilot signals for each mobile terminal in the group of mobile terminals.

16. The method of claim 14, further comprising receiving sounding signals from each mobile terminal in the group of mobile terminals.

17. The method of claim 16, further comprising receiving pilot signals from each mobile terminal in the group of mobile terminals.

18. The method of claim 14, further comprising removing at least one mobile terminal from the group of mobile terminals.

* * * * *